J. R. GAMMETER.
ART OF VULCANIZING RUBBER.
APPLICATION FILED JUNE 20, 1907.
906,489.
Patented Dec. 8, 1908.
2 SHEETS—SHEET 2.
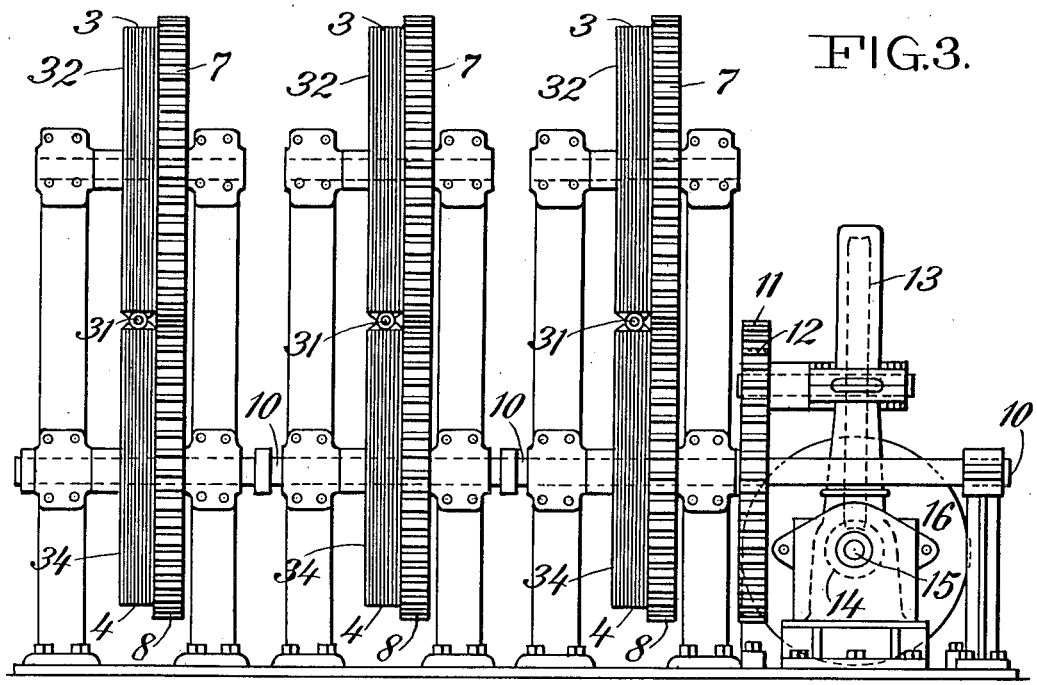
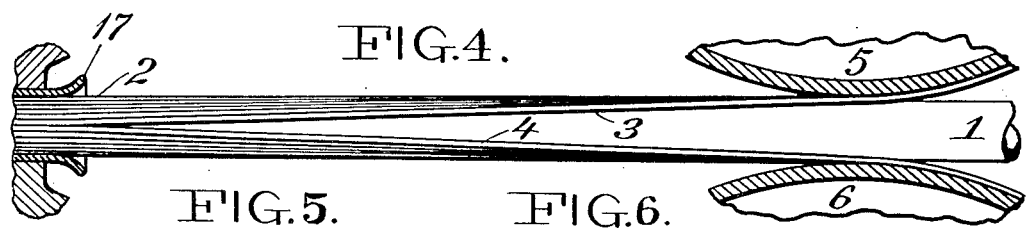
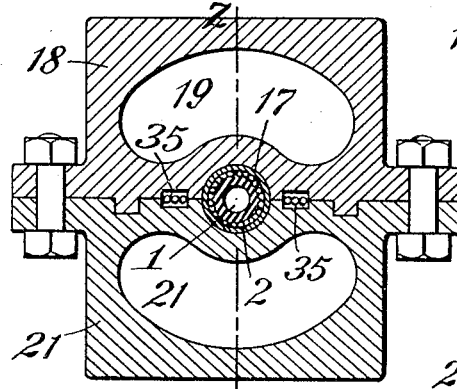
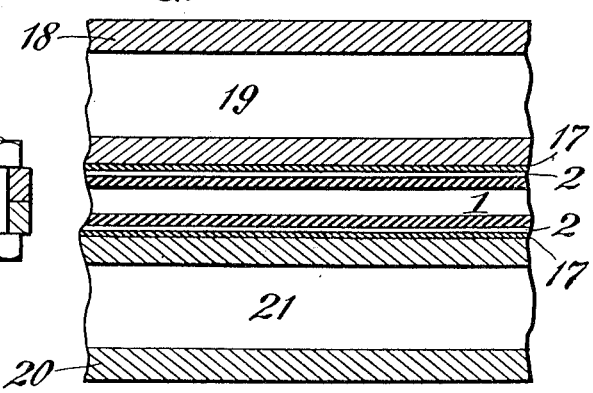
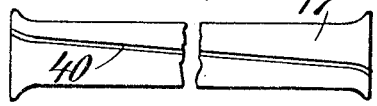
WITNESSES:
INVENTOR

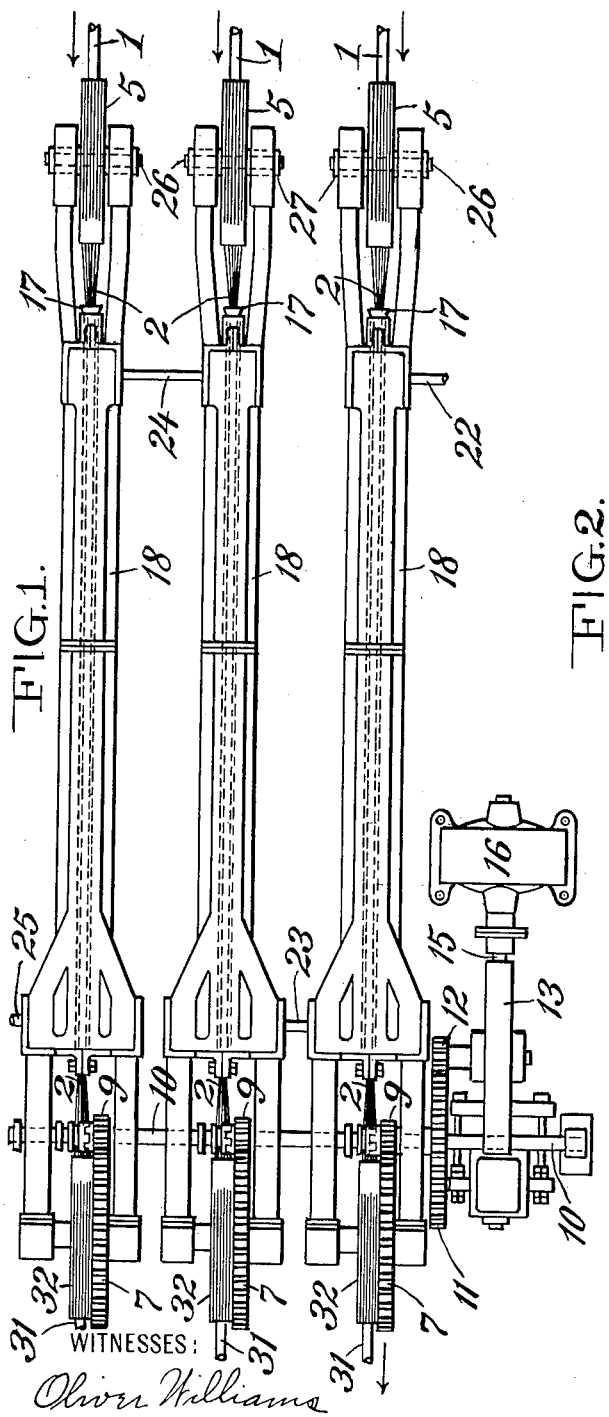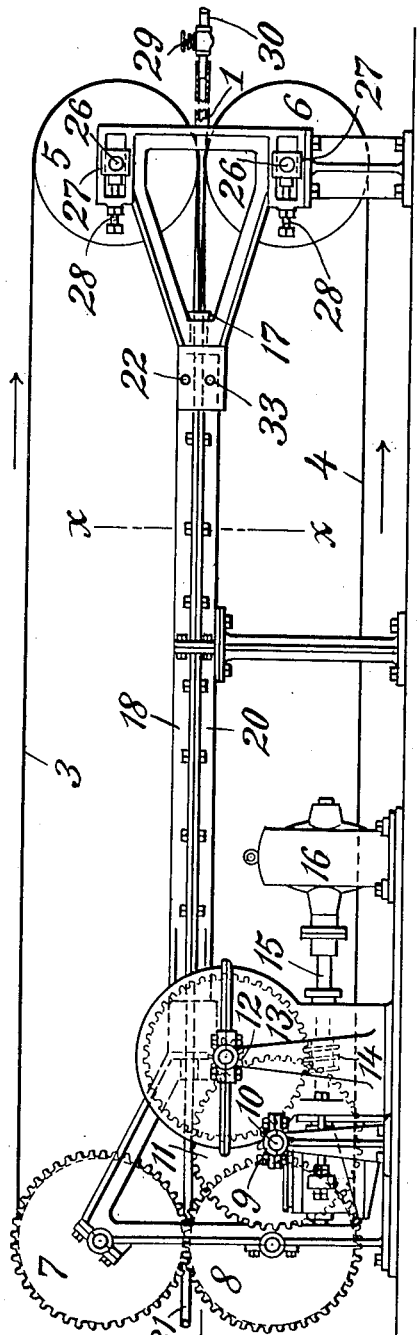

UNITED STATES PATENT OFFICE.

JOHN R. GAMMETER, OF AKRON, OHIO, ASSIGNOR TO THE B. F. GOODRICH COMPANY, OF AKRON, OHIO, A CORPORATION OF OHIO.

ART OF VULCANIZING RUBBER.

No. 906,489.            Specification of Letters Patent.           Patented Dec. 8, 1908.

Original application filed May 20, 1907, Serial No. 374,686. Divided and this application filed June 20, 1907.
Serial No. 379,831.

*To all whom it may concern:*

Be it known that I, JOHN R. GAMMETER, a citizen of the United States of America, residing at the city of Akron, county of Summit, and State of Ohio, have invented certain new and useful Improvements in the Art of Vulcanizing Rubber, (Case C^A,) of which the following is a specification.

My invention relates to improvements in methods of vulcanizing articles of rubber whereby vulcanization may be carried on as a continuous process.

It particularly relates to an improved and continuous process of curing or vulcanizing hose, tubing, solid or hollow rubber tires, and the like articles of rubber, without coiling, in any desired lengths, by means of a novel endless steam jacketed wire channel, or mold conveyer, and means for causing the same to travel continuously through the said steam jacket whereby vulcanization is effected in transit.

My invention has for its objects the provision of a method whereby hose or the like may be continuously produced in unlimited lengths and may be cured or vulcanized while straight so that the finished product will have no tendency to coil or kink.

A further object of my invention is the production of hose and the like of great durability at less cost of material and manufacture than that resulting from any prior process.

The manufacture of hose as at present practiced is subject to alternative disadvantages. If the hose is to be cured in straight lengths, only comparatively short lengths can be produced through the limitations imposed by the depth of practicable vulcanizing chambers. If greater lengths be desired, the uncured hose must be coiled during vulcanization. After the vulcanization, hose thus cured has a tendency to coil and is not homogeneous. When in use, one side is compressed beyond normal and the opposite is stretched beyond normal. The side with longer radius in the coil being under tension of compression while the opposite side being under tension of stretch, any tendency to weakness or inherent flaw in the latter side is magnified and developed. The hose made by my process will always lie normally straight and the corrugations upon its exterior surface formed by the wire mold serve to protect it from wear to such an extent that less rubber is required for this outer jacket.

I attain these objects by the method hereinafter set forth which may be practiced by the apparatus disclosed in the accompanying drawings forming part of this specification, or by any other suitable means or apparatus.

This case is a division of my application for apparatus for vulcanizing rubber filed May 20, 1907, Serial Number 374,686, in which the novel apparatus herein disclosed is claimed.

In the drawings Figure 1 is a plan view of a set of three vulcanizers showing endless conveyers and the means for causing their continuous travel therethrough. Fig. 2 shows an elevation of the apparatus illustrated in Fig. 1. Fig. 3 is an end view in elevation of this apparatus. Fig. 4 is a detail sectional view showing the endless wire bands constituting a combined mold and conveyer. Fig. 5 is a transverse sectional view of the parted steam jacket and mold on the line $x$—$x$ of Fig. 2. Fig. 6 is a section of same at right angles on the line $z$—$z$ of Fig. 5. Figs. 7 and 8 are an elevation and transverse section respectively of the guide tube.

Like reference numerals throughout the several figures indicate the same parts.

1 is the uncured hose, 2 a channel composed of two endless wire bands 3 and 4 formed into a circle as they enter the flared mouth of the channel pipe or guide tube 17, which runs through the vulcanizer intermediate the jackets 18 and 20 formed within which are steam chambers 19 and 21, respectively. The wire bands 3 and 4 are similarly formed. For example, the upper band 3 is made by passing a single wire through the tube 17, around the drum 32, back to the drum 5 and around it, and again through the tube a sufficient number of times until its parallel strands form a semi-circular arch in the tube; its ends are then united and brazed together. A number of separate parallel endless wires may be used to form the band if desired. The lower band 4 is made in the same manner around its corresponding set of lower drums, 6 and 34. These two separate endless bands of parallel wires, each of a plurality of turns, constitute both a mold and mold conveyer, forming a complete circular channel of wires when passing through the tube 17. The drums 5 and 6 are idler sheaves mounted upon the shaft 26, which is made adjustable by the screws 28 in the supports 27 in which it is journaled, so that the tension of the wire bands composing the endless mold may be suitably adjusted. These bands are shown as broken away in Fig. 1 on the drums 5 and 32, to permit a view of the underlying parts.

32 are the pulling sheaves to which suitable power is applied through a train of gears. A suitable source of power, herein shown as the motor 16, turns a shaft 15 carrying a worm 14, meshing with the cogs of the gear wheel 13 on the driving shaft bearing the pinion 12, which meshes in turn with the spur wheel 11 of the driving shaft 10, bearing the pinions 9, these meshing with the spur wheels 7, whose projecting rims from the sheaves or drums 32 carrying the belt 3. The spur wheel 7 meshes with the spur wheel 8, the extension of whose rim forms the drum or sheave carrying the belt 4, transmitting motion thereby to the idler sheave 6. Application of suitable power thus enables the belts 3 and 4 to be moved at an equal and controlled rate of speed, so that the travel of each half of the mold between the steam jackets 18 and 20 is at a predetermined, equal and constant speed. The steam jacket comprises the cast iron sections 18 and 20, formed within which respectively, are the steam chambers 19 and 21. The two sections 18 and 20 are fitted and bolted together as shown, each chamber having a suitable steam connection 22 and 33, Fig. 2. The steam passes, in case of a series of vulcanizers as here illustrated, into one of the vulcanizers as at 22, through its length and therefrom by the pipe 23 to the next, then through it, and from it the pipe 24 to the next, thence returning by the pipe 25, so that the circulation of steam may be maintained through the series, as illustrated by Fig. 1. The lower chambers are similarly fitted with corresponding steam connections. It is often preferable however to run a header transversely of the chambers and connect each chamber with it.

The method of vulcanization with, and of operation of, my apparatus, in the curing, for example, of rubber hose, which is here chosen for illustration, is as follows:

A tube of unvulcanized rubber having been formed in the usual manner in a tubing machine, and one or more plies of fabric having been braided or woven over the tube by a circular loom or otherwise, and a coating of unvulcanized gum or rubber having been placed over this braided or woven jacket by an insulating die in the usual manner, and this process having been continued until the number of desired plies of alternate fabric and gum have been built up, one end of the hose as thus formed is, initially, introduced from a reel or other suitable carrying mechanism, between the endless wire bands as they leave the idler sheaves 5 and 6, as shown in Fig. 4. It will be understood that these bands serve not only as a mold but also as a conveyer, drawing one end of the hose through the vulcanizer, so that the hose does not slip along the wires but that the wires and the hose travel together inside of the stationary tube 17. Before this free end 31 enters between the endless bands, it is plugged. The other end of the hose upon the feed reel is connected to a source of air supply under pressure shown diagrammatically in this instance as the pipe 30 connected to a source of air pressure, controlled by the valve 29. Compressed air or other compressible medium, as gas, liquid, or steam, is then admitted to the hose throughout its length. In practice I have found that air maintained at the pressure of about fifty pounds to the square inch secures the best results. The uncured hose being formed of the approximate diameter of the endless wire mold, the hose when expanded by inflation before it enters the mold, becomes of somewhat greater diameter and is compressed by the mold upon its entry into the funnel mouth of the tube running through the vulcanizer, thus making it more compact before vulcanization. Steam having been admitted to the steam chambers until they are at the proper temperature for vulcanizing, the apparatus is ready for continuous operation and power may now be applied to the driving drums to convey hose through the vulcanizer at a constant rate predetermined in accordance with the quantity and quality of the rubber compound to be cured. As the hose passes in at one end it gradually becomes heated, the absorbed heat increases with its travel until it attains the temperature requisite for vulcanization at which it remains throughout the balance of its passage, issuing in due course as a finished product. By my method it is thus possible to cure hose of practically unlimited lengths in one piece, by uninterrupted and continuous operation. Any length may be made by splicing the forward end of an uncured length to the rear end of its predecessor in the vulcanizer. The only interruption to the continuity of the process in the latter case is for the purpose of splicing, which can readily be effected by those skilled in the art, the inflation tap being applied at the rear end of such new section. It is to be understood however that each of these sections may be several thousand feet in length if desired, so that it is possible to produce hose of great length without splicing and without interruption of the continuous process of vulcanization, while by splicing, continuous and unlimited lengths may be produced.

It is obvious that the diameter of the curing tube may be varied to adapt it to the desired diameter of the hose to be made and that the number of turns of wire upon the endless bands together forming the circular wire mold will be varied correspondingly. Similarly the rate of travel of the mold will vary in correspondence with the quantity of rubber to be cured, or the thickness of the wall of the hose or tube, and the temperature of the steam chamber will be varied in accordance with the nature of the compound or the amount of material undergoing treatment, likewise the internal pressure, the nature of the inflating medium and the tension of the endless mold will be varied in correspondence with the varied conditions of the stock to be cured.

My process is alike applicable as has been noted, to the curing of solid rubber stock where it is desired to produce unlimited lengths of homogeneous vulcanized compounds, as solid tires or belting.

I have illustrated a construction whereby the number of wires forming the traveling mold may be conveniently varied. In order to accomplish this without cutting the endless wire belt I provide auxiliary channels 35 which may be formed in the walls of the vulcanizing chamber as shown in Fig. 5, one channel for the surplus wires of the upper belt and the other for the surplus wires of the lower belt. To get the wires into and out of the tube 17, I form in the wall of the tube a spiral slot 40 as shown in Figs. 7 and 8. This slot usually makes about one-fourth of a turn in the length of the tube.

In operation it is found that the inner surface of the tube 17 wears away, thus enlarging its diameter and allowing the wire strands to spread apart. In order to keep the tube completely lined with the wires, an additional wire must be from time to time inserted and this is done by means of the above described devices as follows: The parts of the vulcanizing chamber are separated, the wires slackened, and one or more wires are taken out of one of the channels 35 and passed through the slot 40 into the guide tube. The vulcanizing chamber is then put together again, the wires tightened, and the apparatus is ready for operation. In like manner if it is desired to vulcanize hose or other articles of a different diameter, the parts of the vulcanizing chamber can be separated, the wires all taken out through the slot 40, the tube 17 removed, and another tube of the same external diameter but of a different internal diameter put in its place. A sufficient number of wires to line this tube are then inserted through its slot 40 and the parts adjusted for operation.

Having thus described my invention I claim:

1. The method of vulcanizing articles in unlimited lengths consisting in longitudinally advancing the article to be vulcanized, progressively compressing the article laterally as it advances, at a rate substantially equal to that of the advance, and subjecting the portions under compression to heat while maintaining such portions in a substantially straight line.

2. The method of producing vulcanized rubber tubing consisting in advancing the tube continuously through the vulcanizer and progressively inclosing and compressing of the tube laterally as it advances, at a rate substantially equal to that of the advance and subjecting the portions under compression to heat.

3. The method of vulcanizing rubber tubing in unlimited lengths consisting in, first, expanding said tubing; second, in compressing the tubing thus expanded; and third, in passing the tubing while under pressure in continuous travel through a vulcanizing chamber.

4. The method of vulcanizing rubber tubing consisting in filling the tubing with fluid under pressure and passing the same through a vulcanizing chamber.

5. The method of vulcanizing rubber tubing consisting in filling the tubing with fluid under pressure, compressing the outside of the tube and passing the same through a vulcanizing chamber.

6. The method of vulcanizing rubber tubing consisting in subjecting the inner and outer surfaces thereof to pressure and while in this condition passing the tube in continuous travel through a vulcanizing chamber.

7. The method of vulcanizing a continuous strip of rubber stock consisting in gradually feeding it through a vulcanizing chamber, supporting the portions within the chamber in a substantially straight line, inclosing and applying pressure to the successive portions of the strip as they approach and enter the chamber, maintaining such pressure upon the portions of the strip passing through the chamber and removing the pressure from the successive portions of the strip as they emerge from the chamber, whereby those portions wherein vulcanization is actually taking place are maintained in a straight line and under pressure.

8. The method of vulcanizing an article of great length substantially as a continuous operation, which consists in forming a mold about the successive portions of the article to be vulcanized as they approach the vulcanizing chamber, passing the mold surrounded portions of the article through the chamber, and freeing the article from the mold as fast as it emerges from the chamber.

9. The method of vulcanizing an article of great length consisting in feeding it in a longitudinal direction through a vulcanizer, progressively surrounding each portion of the article with molding and compressing means as such portion approaches the entrance to the vulcanizer, maintaining the relation between the molding and compressing means and the respective portions of the article surrounded thereby until such portions have completed their travel through the vulcanizer, and finally progressively freeing such portions from said molding and compressing means as they emerge from the vulcanizer.

JOHN R. GAMMETER.

Witnesses:
 WALKER K. MEANS,
 ARTHUR E. DAVISON.